June 25, 1957
H. R. KARLEN
2,797,071
AGITATOR FOR HOT CHOCOLATE ETC
Filed June 23, 1954
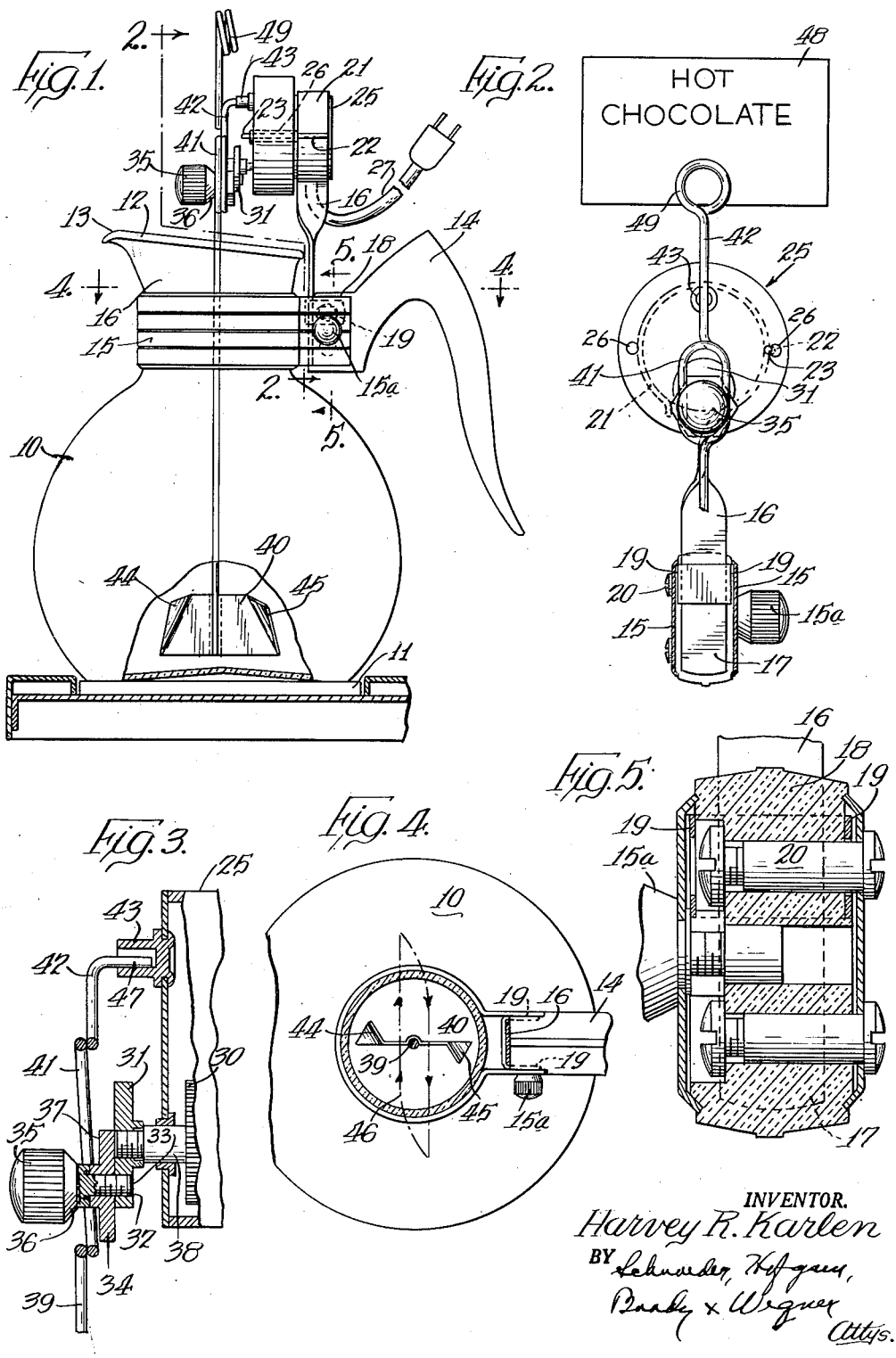
INVENTOR.
Harvey R. Karlen United States Patent Office 2,797,071
Patented June 25, 1957

2,797,071

AGITATOR FOR HOT CHOCOLATE, ETC.

Harvey R. Karlen, Chicago, Ill., assignor to Cory Corporation, a corporation of Delaware Application June 23, 1954, Serial No. 438,642

10 Claims. (Cl. 259—101)

This invention relates to an agitator unit and more particularly to such a unit used with a decanter for beverages to maintain the beverage in an agitated and mixed state.

It is desirable to maintain such beverages as hot chocolate in suspension so that when they are served the beverages shall be adequately and properly mixed. Particles of chocolate tend to deposit out of the suspension, and in restaurants where such drinks are regularly served hot a settling problem is encountered. The solid particles depositing upon the bottom of a glass container may cause hot spots, which, under the influence of a heating plate, may crack the decanter glass. Additionally, the appearance of chocolate in the bottom of a decanter is not particularly pleasing nor conducive to sales of the drink to customers.

The agitator of the present invention also avoids the formation of a skin on the liquid surface of drinks made of milk such as hot chocolate.

It is therefore the principal object of the present invention to provide an agitator mechanism which is inexpensive from the standpoint of manufacture and from the standpoint of operation.

A further object is to provide an agitator which will thoroughly and properly maintain beverage liquid in proper suspension.

A further object is to provide an agitator of the character described which may be easily mounted on a decanter and removable from the decanter for cleaning purposes.

Other objects, features and advantages of the present invention will be apparent from the following description taken in conjunction with the accompanying drawings illustrating a preferred embodiment in which:

Figure 1 is a side elevational view partly broken away and partly in section of a decanter having the agitator unit of this invention mounted thereon;

Figure 2 is a fragmentary front elevational view of the agitator mechanism taken substantially along line 2—2 in Figure 1;

Figure 3 is a fragmentary vertical sectional view illustrating the driving mechanism;

Figure 4 is a fragmentary horizontal sectional view taken substantially along line 4—4 in Figure 1; and Figure 5 is a fragmentary vertical sectional view through the handle supporting mechanism taken substantially along line 5—5 in Figure 1.

While this invention is susceptible of embodiments in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Restaurants and coffeeshops usually mix a beverage in a decanter which will withstand heat so that the beverage may be maintained in a serving decanter at all times. The decanter 10 is formed of glass resistant to heat so that it may be placed upon a hotplate 11 to maintain the contents warm. The decanter has an upwardly open top 12 and a spout 13 at one side. A handle 14 is secured to a metal collar 15 extending around the neck of the decanter so that it may be conveniently handled for serving. A thumb nut 15a may loosen the handle and collar.

The agitator mechanism may be applied to the decanter without requiring any modification of the latter. A bracket is provided for supporting the mechanism on the decanter and is formed of spring strap metal bent into a proper shape to be secured to the decanter handle. The bracket has a stem portion 16 extending generally upright with the lower end 17 extending downwardly between the shank 18 of the handle 14 and the decanter. Ears 19 extend outwardly of the stem 16 and are apertured so that a securing bolt 20 in the handle structure may pass through the aperture. Both ears 19 repose next to the handle shank 18 so as to be covered by the ends of the metal collar 15. At its upper end, the strap is bent through a curved portion 21 to fit around the motor casing 25. The curved portion grasps the motor by spring action. A finger 22 extends forwardly into a bore in the motor casing maintaining the motor and support in proper relation. The outer end of the finger 22 is offset at 23 to extend through the bore and in effect lock the motor and support releasably together. The motor may be manually taken off the support when desired. Likewise, the bracket may be removed from the decanter handle.

The agitator mechanism is supported on and solely by the spring strap bracket. A motor is housed in a round housing 25 provided with a pair of bores 26 adapted to receive the finger 22. This finger slides into one bore and is grasped and tightened in the bores by the action of the offset 23. The motor itself is one of small capacity drawing not more than 4 watts from the usual alternating current. Electrical lead 27 may be used to provide electricity to the motor.

A beverage in the decanter is agitated by a paddle 40 driven back and forth in the decanter by the motor in the housing 25. A driving connection between the motor and paddle is provided by a supporting stem 39 connected to the drive shaft 38 of the motor. The particular connection is by means of a scotch yoke which oscillates the stem 39 about a pivot.

The specific form of the driving connection embodying the scotch yoke is best seen in Figure 3. The motor shaft 38 is reduced in speed through gearing 30. A disk 31 is mounted on the outer end of the shaft 38 and is provided with an eccentrically located threaded bore 32. A stud 33 is threaded in the bore 32 and carries a collar 34 also threaded on the stud. An outer thumb nut 35 may be threaded on the stud also and the spacing between the collar and thumb nut may be chosen to allow some space between the inner edges 36 and 37. This space is chosen to permit some lateral movement of the stem between the surfaces 36 and 37 for the purposes as will appear. The collar 34 may act as a lock nut securing the stud in the disk 31. The effect of the mechanism just described is to provide a crank on the motor shaft 38.

The stem 39 is formed in a loop 41 which extends around the stud 33 between the thumb nut 35 and collar 34. A portion 42 extends above the loop and is pivotally mounted loosely in a boss 43 secured on the motor housing 25. The stem may be driven in an oscillatory path by the combination of the scotch yoke connection formed by the crank means in the stem moving the stem about the pivot provided by the portion 42 and the stem. Generally speaking, the agitator paddle 40 swings back and forth like a pendulum through a variable speed in its path, the speed being smaller at the extremity of the path and being at a maximum during the central portion of the travel. The path is also arcuate in nature with the paddle being quite close to the bottom of the decanter at the middle of its swing.

The paddle 40 is shaped to provide a reaction upon the liquid beverage tending to stir the liquid in several directions. A wing 44 on one edge of the paddle is inclined to the vertical and outwardly from the stem 39. An opposite wing 45 is inclined from the face of the paddle in the opposite direction, also inclined to the vertical and extending away from the stem 39. Due to the shape of the wings 44 and 45, several reactions take place as the paddle is swung from one extreme position to the other. The wing that is pointing in the same direction as the movement of the paddle tends to make liquid flow downwardly and toward the center of the paddle. An opposite reaction occurs tending to move the paddle laterally from the general oscillatory direction of movement. The opposite wing also tends to move the paddle laterally in the same direction, however it tends to move the liquid upwardly and away from the general oscillatory direction of movement. This action is reversed upon a reversal of the direction of movement of the paddle. The path 46 assumed by the paddle is therefore similar to that shown in dotted line on Figure 4.

The irregular path followed by the agitator in passing through the liquid is desirable in that the paddle can then pass over a greater area of the decanter bottom and disturb more of the particles that may tend to settle out of the liquid. The structure of the scotch yoke and the pivot point of the stem contribute to permit such movement. As before mentioned, the space between the thumb nut 35 and collar 34 is chosen to permit lateral play of the loop 41 in the stem between the adjacent surfaces of these parts. The boss 43 holds the inner portion 47 which pivots the stem on the motor housing very loosely so that some lateral movement is permitted in the pivot point. The reaction of the liquid on the wings 44 and 45 may thus move the paddle sideways in the container while the motor is propelling the paddle through its oscillatory path.

When the agitator is used in the restaurant, a placard 48 may be conveniently attached to the swinging stem by means of a wire clip 49 secured to the upper end of the stem. The placard may contain advertising such as "Hot Chocolate" as indicated.

The parts of the apparatus are properly treated to be easily cleaned and maintained. Ordinarily, the metal parts are stainless steel. Other parts may be nickel plated to insure that all surfaces which may come in contact with the food may be maintained properly sanitary. All of the parts may be disassembled quite quickly and easily to insure proper cleaning.

I claim:

1. A beverage agitator unit comprising: a motor having a generally horizontal drive shaft; means forming a crank on the motor drive shaft adapted to be driven in an upright circular path; and a paddle having a supporting stem extending upwardly to the motor, said stem being pivotally secured to the motor and having a scotch yoke connection with the crank means to provide oscillatory motion of the paddle, the pivotal and scotch yoke connections of the stem to the motor each being relatively loose to permit lateral movement of the stem relative to the motor allowing the paddle to follow an irregular path in its oscillations.

2. A beverage agitator unit comprising: a motor having a generally horizontal drive shaft; means forming a crank on the motor drive shaft adapted to be driven in an upright circular path; a paddle supporting stem pivotally secured to the motor and having a scotch yoke connection with said crank means, said stem extending below the motor and adapted for insertion into beverage to be agitated; and a paddle on the lower end of said stem having a body portion extending transversely of the general oscillatory direction of stem movement, and a wing on the body portion tending to move the paddle and stem laterally of the oscillatory path of the stem, said stem being supported loosely on the motor to permit limited lateral movement of the paddle from said oscillatory path.

3. A beverage agitator unit comprising: a motor having a generally horizontal drive shaft; means forming a crank on the motor drive shaft adapted to be driven in an upright circular path; a paddle supporting stem pivotally secured to the motor and having a scotch yoke connection with said crank means, said stem extending below the motor and adapted for insertion into beverage to be agitated; and a paddle mounted on the stem for stirring the beverage, said paddle having a portion positioned at an angle to the oscillatory path of the stem tending to move the paddle sideways in the liquid, and said stem being loosely connected to said motor to permit the paddle to move in an irregular path in the liquid.

4. Beverage maintaining means of the character described, comprising: a container adapted to hold a beverage; a supporting bracket having a portion adapted to be attached to the container; a motor removably secured to the supporting bracket and having a generally horizontal drive shaft; means forming a crank on the drive shaft adapted to be driven in a circular path in an upright plane; and an agitator paddle having a stem extending upwardly and looped in scotch yoke fashion on said crank, said stem extending above the looped portion and pivotally secured to said motor, the scotch yoke connection between said crank means and looped portion having play laterally of the plane of movement of said crank means and the pivotal connection to said motor permitting lateral play so that the paddle may assume an irregular path in the beverage upon driving action of the motor.

5. A beverage agitator unit comprising: a motor having a generally horizontal drive shaft; means forming a crank on the motor drive shaft adapted to be driven in an upright circular path; a paddle supporting stem pivotally secured to the motor and having a loose scotch yoke connection with said crank means, said stem extending below the motor and adapted for insertion into beverage to be agitated; and a paddle on the lower end of the stem having a flat body portion generally positioned transversely of the oscillatory direction of stem movement, a wing on each outer edge of the body portion inclined to vertical and to said oscillatory direction of movement for alternately agitating a beverage liquid upwardly and outwardly and then downwardly and inwardly from said direction of movement upon each change in direction of movement of the paddle through the liquid the pivotal connection of the stem to the motor and the loose scotch yoke connection permitting lateral play so that the paddle may assume an irregular path in the beverage upon driving action of the motor.

6. Beverage maintaining means of the character described, comprising: a decanter adapted to receive a beverage; a supporting bracket having a portion adapted to be attached to the decanter; a motor removably secured to the supporting bracket and having a generally horizontal drive shaft; a disk on the drive shaft having an eccentrically positioned threaded bore; a stud in the threaded bore and a thumb nut on the outer end of the stud, said disk and stud forming a crank; an upright stem having a loop portion loosely mounted about said stud between the thumb nut and disk, said stem having an upper portion pivotally attached to the motor above the crank and a lower portion extending downwardly and adapted to enter beverage in the decanter, said crank being adapted to impart oscillatory movement to the stem; and a paddle on the lower end of the stem, said paddle having a wing tending to move the stem and paddle laterally of its oscillatory path as the paddle moves through beverage in the decanter, said thumb nut and disk being spaced on said stud to permit limited lateral movement of the stem during oscillations of the stem so that the paddle may move in an irregular path to agitate the beverage.

7. An agitator unit comprising: a motor having a drive shaft; means forming a crank on the motor drive shaft adapted to be driven in a circular path; and a paddle and supporting stem positioned generally normal to the circular path of the crank means and having a scotch yoke connection with the crank means and a pivotal connection to the motor spaced from the crank so that driving action of the motor can move the paddle in an oscillatory path, the pivotal and scotch yoke connections of the stem to the motor each being relatively loose to permit limited lateral movement of the stem relative to the motor allowing the paddle to follow an irregular path in its oscillations.

8. Beverage maintaining means of the character described comprising: a decanter adapted to receive beverages; a spring strap frame rearwardly connected to the decanter; a motor supported on the frame above the decanter and having a drive shaft; crank means on the motor drive shaft movable in an upright circular path; and an agitator paddle and a supporting stem with the paddle on the lower end of the stem, said stem being pivotally secured to the motor and having a loop below the pivotal connection forming a scotch yoke connection with the crank means, said motor being adapted to drive the paddle through an arcuate oscillatory path in the decanter, said stem having a length to position the paddle closely adjacent the bottom of the decanter at the center of its arcuate path, said paddle having on one outer edge thereof a first wing inclined to vertical and to said oscillatory direction of movement and said paddle having on the opposite outer edge thereof a second wing inclined to vertical at the same angle as said first wing and inclined to said oscillatory direction of movement oppositely of said first wing, each of said wings acting to agitate beverage liquid upwardly and outwardly when the paddle is moved in one direction along the oscillatory path and then downwardly and inwardly on reverse movement along said path, said scotch yoke connection moving said paddle at a variable speed along said oscillatory path with a maximum speed along the center portion of the paddle travel when the paddle is closest to the decanter bottom.

9. Beverage maintaining means of the character described comprising: a decanter adapted to retain a beverage; a motor having a drive shaft; means forming a crank secured to the drive shaft; a paddle and supporting stem connected to the motor to receive oscillatory movement from said crank means, a spring strap frame for supporting said motor with the paddle positioned in the decanter, said frame being looped around the motor and having a lower portion for removably securing the frame to the decanter; a forwardly extending post on said looped portion; and a housing about the motor having a bore to receive said post when the looped portion is about the housing in motor supporting relation.

10. Beverage maintaining means of the character described, comprising: a beverage decanter having a handle secured thereto; a spring strap frame having a loop portion and a generally horizontal finger portion on one side of said loop portion; an agitator unit locked on said frame by said finger portion; a motor housing having a bore for receiving said finger portion when the loop portion is about the housing; and a downwardly extending post portion on said frame and joined to said loop portion, said post portion having an apertured ear thereon removably securing the frame to the handle of the decanter to support the agitator unit in proper relation to the decanter.

References Cited in the file of this patent

UNITED STATES PATENTS

| 188,863 | Daggett | Mar. 27, 1877 |
| 2,297,171 | Sanford | Sept. 29, 1942 |

FOREIGN PATENTS

| 211,118 | Great Britain | Aug. 7, 1924 |
| 290,107 | Italy | of 1931 |